US010552970B2

(12) United States Patent
Huang et al.

(10) Patent No.: US 10,552,970 B2
(45) Date of Patent: Feb. 4, 2020

(54) EFFICIENT GUIDE FILTER FOR DEPTH REFINEMENT

(71) Applicant: QUALCOMM Incorporated, San Diego, CA (US)

(72) Inventors: Kuang-Man Huang, Taipei (TW); Michel Adib Sarkis, San Diego, CA (US); Yingyong Qi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 79 days.

(21) Appl. No.: 15/870,483

(22) Filed: Jan. 12, 2018

(65) Prior Publication Data

US 2019/0220987 A1 Jul. 18, 2019

(51) Int. Cl.
| | |
|---|---|
| *G06T 7/50* | (2017.01) |
| *G06T 7/11* | (2017.01) |
| *G06T 5/20* | (2006.01) |
| *G06T 5/00* | (2006.01) |
| *G06T 7/162* | (2017.01) |
| *G06T 7/136* | (2017.01) |

(52) U.S. Cl.
CPC ............... *G06T 7/50* (2017.01); *G06T 5/002* (2013.01); *G06T 5/005* (2013.01); *G06T 5/20* (2013.01); *G06T 7/11* (2017.01); *G06T 7/136* (2017.01); *G06T 7/162* (2017.01); *G06T 2200/04* (2013.01); *G06T 2207/10028* (2013.01); *G06T 2207/20012* (2013.01); *G06T 2207/20192* (2013.01)

(58) Field of Classification Search
CPC ........... G06T 7/50; G06T 7/162; G06T 5/002; G06T 5/20; G06T 7/11; G06T 5/005
See application file for complete search history.

(56) References Cited

U.S. PATENT DOCUMENTS

| | | | | |
|---|---|---|---|---|
| 9,030,469 B2 * | 5/2015 | Huang | ................. | G06T 7/0071 345/419 |
| 10,038,894 B1 * | 7/2018 | Kopf | .................... | H04N 13/271 |
| 10,181,175 B2 * | 1/2019 | Haraden | ................. | G06T 1/60 |

(Continued)

OTHER PUBLICATIONS

Barron J.T., et al., "The Faster Bilateral Solver", ECCV, 2016, pp. 617-632.

(Continued)

*Primary Examiner* — Ming Y Hon
(74) *Attorney, Agent, or Firm* — QUALCOMM Incorporated

(57) ABSTRACT

A depth based scanning system can be configured to determine whether pixel depth values of a depth map are within a depth range; determine a component of the depth map comprised of connected pixels each with a depth value within the depth range; replace the depth values of any pixels of the depth map that are not connected pixels; determine whether each pixel of the connected pixels of the component has at least a threshold number of neighboring pixels that have a depth value within the depth range; and for each pixel of the connected pixels of the component, if the pixel is determined to have at least the threshold number of neighboring pixels, replace its depth value with a filtered depth value that is based on the depth values of the neighboring pixels that have a depth value within the depth range.

31 Claims, 6 Drawing Sheets

(56) References Cited

U.S. PATENT DOCUMENTS

| | | | |
|---|---|---|---|
| 2002/0186216 A1* | 12/2002 | Baumberg | G06T 17/10 345/422 |
| 2008/0247670 A1* | 10/2008 | Tam | G06T 7/50 382/298 |
| 2010/0046837 A1 | 2/2010 | Boughorbel | |
| 2010/0177961 A1* | 7/2010 | Kalman | G06T 3/4015 382/167 |
| 2010/0208994 A1 | 8/2010 | Yao et al. | |
| 2011/0050864 A1* | 3/2011 | Bond | G06T 7/579 348/51 |
| 2012/0213450 A1 | 8/2012 | Shirley et al. | |
| 2013/0033582 A1* | 2/2013 | Sun | G06T 5/002 348/47 |
| 2013/0070050 A1* | 3/2013 | Ha | H04N 5/144 348/43 |
| 2013/0222555 A1* | 8/2013 | Nagasaka | H04N 9/045 348/50 |
| 2017/0127046 A1 | 5/2017 | Das | |
| 2017/0178332 A1 | 6/2017 | Lindner et al. | |

OTHER PUBLICATIONS

Gastal E.S.L., et al., "Domain Transform for Edge-Aware Image and Video Processing", SIGGRAPH, 2011, ACM SIGGRAPH 2011, pp. 1-11.

He K, et al., "Guided Image Filtering," IEEE Transactions on Pattern Analysis and Machine Intelligence, vol. 35, No. 6, Jun. 2013, 13 pp.

Matsuo T., et al., "Weighted Joint Bilateral Filter with Slope Depth Compensation Filter for Depth Map Refinement", 2013, 10 pages.

Tomasi C., et al., "Bilateral Filtering for Gray and Color Images," in Proceedings of the IEEE International Conference on Computer Vision, 1998, pp. 839-846.

\* cited by examiner

| 0 | 0 | 1 | 0 | 0 |
|---|---|---|---|---|
| 0 | 0 | 0 | 0 | 0 |
| 0 | 0 | X | 0 | 0 |
| 0 | 0 | 0 | 0 | 0 |
| 0 | 1 | 0 | 0 | 1 |

Filtering NOT Applied on X

FIG. 3A

| 1 | 0 | 1 | 1 | 1 |
|---|---|---|---|---|
| 1 | 1 | 0 | 0 | 0 |
| 0 | 0 | X | 1 | 1 |
| 1 | 0 | 0 | 1 | 1 |
| 1 | 0 | 1 | 1 | 1 |

Filtering Applied on X

FIG. 3B

EFFICIENT GUIDE FILTER FOR DEPTH REFINEMENT

CROSS-REFERENCE TO RELATED APPLICATIONS

None.

STATEMENT ON FEDERALLY SPONSORED RESEARCH OR DEVELOPMENT

None.

BACKGROUND

Field of the Disclosure

This disclosure relates generally to image scanning systems and, more specifically, to depth based image scanning systems.

Description of Related Art

Depth based image scanning systems, such as 3-dimensional (3D) depth based image scanning systems, use sophisticated image capture and signal processing techniques to render video and still images. Depth based scanning systems scan a scene and provide an image of the scene, along with a depth map (i.e., image) of the scene, to allow for reconstruction of the scene. The depth map contains information that represents the distance of surfaces of objects in the scene from a viewpoint. These depth maps, however, often contain artifacts. The artifacts may be caused by noise and/or may include outlier pixels with invalid depth values (e.g., holes), and can degrade the reconstruction quality of the image.

Edge-preserving smoothing filters such as bilateral filters are often used to remove these artifacts while attempting to preserve object edges. However, these methods are computationally intensive and not suitable for real time applications without hardware acceleration. In addition, outlier pixels with invalid depth values are unreliable and can affect refinement results. Thus, there are opportunities to address and minimize these problems in an attempt to obtain high quality 3-dimensional (3D) image reconstruction, for example, in real time.

SUMMARY

In some examples, a depth based scanning system includes electronic circuitry, such as one or more processors, that can be configured to obtain a depth map that includes pixel depth values for pixels of an image and determine whether each of the pixel depth values is within a depth range. The electronic circuitry can determine at least one component comprised of connected pixels of the pixels of the depth map, where each of the connected pixels has a pixel depth value determined to be within the depth range. The electronic circuitry can replace the depth values of any pixels of the depth map that are not connected pixels of the component(s) with a depth value that indicates no depth. For example, the electronic circuitry can replace the depth values of non-connected pixels with a depth value defined as an invalid depth (e.g., 0).

The electronic circuitry can determine whether each pixel of the connected pixels of the component(s) has at least a threshold number of neighboring pixels where each neighboring pixel has a depth value determined to be within the depth range. For each pixel of the connected pixels of the component(s), if the pixel is determined to have at least the threshold number of neighboring pixels, the electronic circuitry can replace the pixel's depth value with a filtered depth value. The filtered depth value can be based on the depth values of the neighboring pixels with a depth value within the depth range. For example, the filtered depth value can be the mean of the depth values of the neighboring pixels with valid depth values.

In some examples, a method of processing a depth map can include obtaining a depth map that includes pixel depth values for pixels of an image, and determining whether each of the pixel depth values is within a depth range. The method can include determining at least one component comprised of connected pixels of the pixels of the depth map, where each of the connected pixels has a pixel depth value determined to be within the depth range.

The method can include replacing the depth values of any pixels of the depth map that are not connected pixels of the component(s) with a depth value that indicates no depth. The method can also include determining whether each pixel of the connected pixels of the component(s) has at least a threshold number of neighboring pixels that each have a depth value determined to be within the depth range. The method can also include, for each pixel of the connected pixels of the component(s), if the pixel is determined to have at least the threshold number of neighboring pixels, replacing its depth value with a filtered depth value. The filtered depth value can be based on the depth values of the neighboring pixels with a depth value within the depth range. For example, the filtered depth value can be the mean of the depth values of the neighboring pixels with valid depth values.

In some examples, a method of processing a depth map includes obtaining a depth map comprising a plurality of depth map pixels each having a pixel depth value, where each depth map pixel corresponds to one pixel of a plurality of pixels in an image. The method can include determining a revised map from the depth map where the revised map comprises a plurality of revised map pixels, where each of the plurality of revised map pixels corresponds to one of the depth map pixels that has a pixel depth value within a predetermined depth range.

The method can include determining a mask from the depth map where the mask comprises a plurality of mask pixels, and where each of the plurality of mask pixels corresponds to one of the depth map pixels and to one of the revised map pixels. For each one of the plurality of mask pixels, the method can include assigning a first predetermined value where the corresponding depth map pixel has a pixel depth value that is within the predetermined depth range, otherwise assigning a second predetermined value.

The method can include determining at least one component of the mask where the at least one component comprises a plurality of connected pixels each having the first predetermined value. The method can include determining a largest component of the at least one component of the mask. The method can include determining a bounding box for the largest component and, for a target pixel of the mask pixels inside the bounding box, where the target pixel has a threshold number of neighboring pixels assigned the first predetermined value, determining a filtered depth value for the corresponding pixel in the revised map.

In some examples, a non-transitory, computer-readable storage medium includes executable instructions. The executable instructions, when executed by one or more processors, can cause the one or more processors to obtain a depth map that includes pixel depth values for pixels of an image and determine whether each of the pixel depth values is within a depth range. The executable instructions, when executed by the one or more processors, can cause the one or more processors to determine at least one component comprised of connected pixels of the pixels of the depth map, where each of the connected pixels has a pixel depth value determined to be within the depth range.

The executable instructions, when executed by the one or more processors, can cause the one or more processors to replace the depth values of any pixels of the depth map that are not connected pixels of the component(s) with a depth value that indicates no depth. The executable instructions, when executed by the one or more processors, can cause the one or more processors to determine whether each pixel of the connected pixels of the component(s) has at least a threshold number of neighboring pixels where each neighboring pixel has a depth value determined to be within the depth range. For each pixel of the connected pixels of the component(s), if the pixel is determined to have at least the threshold number of neighboring pixels, the executable instructions, when executed by the one or more processors, can cause the one or more processors to replace the pixel's depth value with a filtered depth value. The filtered depth value can be based on the depth values of the neighboring pixels with a depth value within the depth range. For example, the filtered depth value can be the mean of the depth values of the neighboring pixels with valid depth values.

In some examples, a depth based scanning system can include a means for obtaining a depth map that includes pixel depth values for pixels of an image; a means for determining whether each of the pixel depth values is within a depth range; a means for determining at least one component comprised of connected pixels of the pixels of the depth map, where each of the connected pixels has a pixel depth value within the depth range; a means for replacing the depth values of any pixels of the depth map that are not connected pixels of the component(s) with a depth value that indicates no; a means for determining whether each pixel of the connected pixels of the component(s) has at least a threshold number of neighboring pixels that each have a depth value within the depth range; and a means, for each pixel of the connected pixels of the component(s), for replacing the pixel's depth value with a filtered depth value if the pixel is determined to have at least the threshold number of neighboring pixels, where the filtered depth value is based on the depth values of the neighboring pixels with a depth value within the depth range.

Among other advantages, the apparatus and methods provide for more efficient depth filtering techniques to refine captured depth images, for example, in real time. In addition, the depth filtering techniques can be executed faster (e.g., can be executed by a same processor in less frames per second), and can require less memory, than conventional depth filtering techniques. As such, cost savings can be observed. Those of ordinary skill in the art will recognize other advantages as well.

BRIEF DESCRIPTION OF DRAWINGS

FIG. 3A is a diagram showing an example of a filtering window frame when depth filtering is not applied;

FIG. 3B is a diagram showing an example of a filtering window frame when depth filtering is applied;

DETAILED DESCRIPTION

Figure 1:
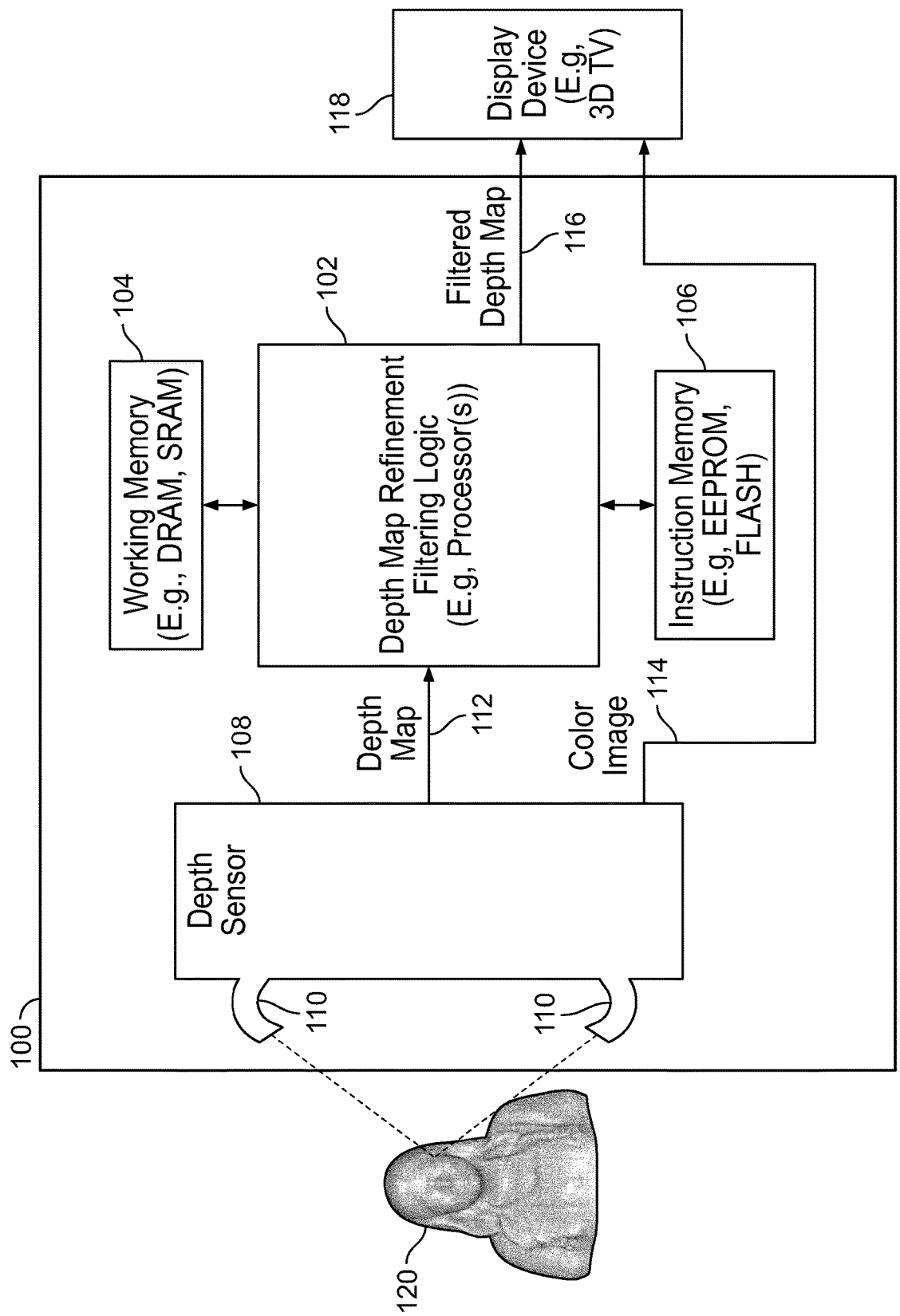
FIG. 1 is a block diagram of an exemplary depth based scanning system with depth map refinement filtering logic.

While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings. It should be understood, however, that the present disclosure is not intended to be limited to the particular forms disclosed. Rather, the present disclosure covers all modifications, equivalents, and alternatives that fall within the spirit and scope of these exemplary embodiments.

In some examples, a depth based scanning system includes one or more processors configured to obtain a depth map comprising a plurality of pixel depth values corresponding to a plurality of pixels of an image. The one or more processors are configured to determine whether each of the plurality of pixel depth values is within a depth range (e.g., a depth range that includes valid depth values).

In some examples, the one or more processors are configured to determine whether each pixel of the plurality of pixels determined to have a pixel depth value within the depth range has at least a threshold number of neighboring pixels with a depth value determined to be within the depth range (i.e., valid depth values). For each pixel of the plurality of pixels, if the pixel is determined to have at least the threshold number of neighboring pixels with a valid depth value, the one or more processors are configured to replace the pixel's depth value with a filtered depth value. The filtered depth value can be based on the depth values of the neighboring pixels with valid depth values. In some examples, the filtered depth value can be based on a subset of the depth values of the neighboring pixels with valid depth values. For example, if there are more neighboring pixels than the threshold number, the filtered depth value can be based on a threshold number of neighboring pixels.

In some examples, the one or more processors are configured to determine at least one component comprised of connected pixels of the plurality of pixels where each of the connected pixels has a pixel depth value determined to be within the depth range. The one or more processors are configured to replace the depth values of any pixels of the plurality of pixels that are not connected pixels of the at least one component with a depth value that indicates no depth.

In some examples, the one or more processors are configured to determine whether each pixel of the connected pixels of the at least one component has at least a threshold number of neighboring pixels with a depth value determined to be within the depth range. For each pixel of the connected pixels, if the pixel is determined to have at least the threshold number of neighboring pixels with valid depth values, the one or more processors are configured to replace the pixel's depth value with a filtered depth value. The filtered depth value can be based on the depth values of the neighboring pixels with valid depth values.

In some examples, the one or more processors are configured to determine that the neighboring pixels comprise a filtering window frame of connected pixels around each pixel of the connected pixels. A larger filtering window frame size (e.g., "x" pixels by "y" pixels) would tend to filter (e.g., smooth) out more image details than a smaller filtering window frame size would. In some examples, a user of the depth based scanning system can configure the filtering window frame size. In some examples, the one or more processors are configured to determine a size of the filtering window frame to be based on a size of the at least one component. For example, the larger the component, the larger the filtering window frame size employed.

In some examples, the one or more processors are configured to determine that the filtered depth value is a mean value of the depth values of the number of neighboring pixels with a depth value within the depth range.

In some examples, the one or more processors are configured to determine a support region around the edges of the at least one component. For each pixel in the support region, the one or more processors are configured to determine if the pixel's depth value was replaced with a filtered depth value. If the pixel's depth value was replaced with a filtered depth value, the one or more processors are configured to replace the filtered depth value with a depth value of a neighboring pixel from the depth map. For example, the filtered depth value can be replaced with a depth value of the closes neighboring pixel in the depth map.

In some examples, the one or more processors are configured to determine a valid depth mask based on the plurality of pixel depth values. The valid depth mask indicates, for each pixel of the plurality of pixels, whether its depth value was determined to be within the depth range. The one or more processors are configured to determine the at least one component based on a union of the depth map and the valid depth mask.

In some examples, the one or more processors are configured to determine a plurality of components each comprised of connected pixels of the plurality of pixels, where each of the connected pixels has a pixel depth value within the depth range. In some examples, the one or more processors are configured to determine the at least one component is a largest component of the plurality of components, where the largest component includes a highest number of connected pixels.

In some examples, the one or more processors are configured to determine a second largest component of the plurality of components with a second highest number of connected pixels. The one or more processors can determine whether each pixel of the connected pixels of the second largest component has at least a threshold number of neighboring pixels with a depth value within the depth range. For each pixel of the connected pixels of the second largest component, if the pixel is determined to have at least the threshold number of neighboring pixels with valid depth values, the one or more processors are configured to replace the pixel's depth value with a filtered depth value. The filtered depth value can be based on the depth values of the neighboring pixels with valid depth values. The one or more processors can be configured to determine additional components as well.

In some examples, the one or more processors are configured to determine that the depth range comprises a first depth range and a second depth range, where the second depth range can be different from the first depth range. For example, the one or more processors can be configured to determine a largest component with pixel depth values in each of the first depth range and the second depth range. The one or more processors can also be configured to determine additional components in each of the depth ranges, and can be configured to determine additional depth ranges as well.

For example, the one or more processors can be configured to determine that a first component includes a highest number of connected pixels with depth values within the first depth range, and determine that a second component includes a highest number of connected pixels with depth values within the second depth range. The one or more processors can be configured to determine whether each pixel of the connected pixels of the first component has at least a threshold number of neighboring pixels with a depth value determined to be within the first depth range.

In some examples, the one or more processors can be configured to replace a pixel's depth value with a filtered depth value that is based on depth values of neighboring pixels. For example, for each pixel of the connected pixels of a first component, if the pixel is determined to have at least a threshold number of neighboring pixels, the pixel's depth value is replaced with a filtered depth value that is based on the depth values of neighboring pixels with a depth value within the first depth range.

In some examples, the one or more processors can be configured to determine whether each pixel of the connected pixels of the second component has at least a threshold number of neighboring pixels with a depth value determined to be within the second depth range. The threshold number of neighboring pixels used for the second component can be the same, or different from, the threshold number of neighboring pixels used for the first component.

In some examples, the one or more processors can be configured to replace a pixel's depth value with a filtered depth value that is based on depth values of neighboring pixel with a depth value within the second depth range. For example, for each pixel of the connected pixels of the second component, if the pixel is determined to have at least the threshold number of neighboring pixels, replace its depth value with a filtered depth value that is based on the depth values of the neighboring pixels with a depth value within the second depth range.

In some examples, the one or more processors are configured to determine the depth range spans from a minimum depth to a maximum depth, inclusively. The one or more processors are configured to determine whether the depth value of each pixel of the plurality of pixels is above the maximum depth, and determine whether the depth value of each pixel of the plurality of pixels is below the maximum depth. For example, the one or more processors can be configured to determine that pixel depth values above the maximum depth, or below the minimum depth, are invalid depth values.

In some examples, the one or more processors are configured to replace the depth value of each pixel of the plurality of pixels that is determined to not be within the depth range (i.e., invalid depth values) with a depth value within the depth range. For example, the one or more processors can be configured to replace the depth value of each pixel of the plurality of pixels determined to have a depth value above the maximum depth with the maximum depth. In some examples, the one or more processors can be configured to replace the depth value of each pixel of the plurality of pixels determined to have a depth value below the minimum depth with the minimum depth.

Turning to the figures, FIG. 1 is a block diagram of an exemplary depth based scanning system 100 including depth map refinement filtering logic 102 in communication with (e.g., operatively coupled to) depth sensor 108 for capturing images. For example, depth sensor 108 can capture an image of object 120 via cameras 110. In some examples, depth sensor 108 can be a stereo camera with right and left cameras. In some examples, depth sensor 108 can be an infrared camera, a stereo camera, or structured light camera capable of capturing depth information. Based on captured images, depth sensor 108 can provide a depth map 112 and a color image 114.

Depth map refinement filtering logic 102 can include any suitable logic. For example, depth map refinement filtering logic 102 can include one or more processors such as one or more microprocessors, image signal processors (ISPs), digital signal processors (DSPs), central processing units (CPUs), graphics processing units (GPUs), or any other suitable processors. Additionally, or alternatively, depth map refinement filtering logic 102 can include one or more field-programmable gate arrays (FPGAs), one or more application-specific integrated circuits (ASICs), one or more state machines, digital circuitry, or any other suitable circuitry.

Depth map refinement filtering logic 102 is operable to obtain depth map 112 from depth sensor 108, filter the depth map 112 as is described in more detail with respect to FIG. 2 below, and provide a filtered depth map 116. For example, display device 118 can obtain filtered depth map 116 from depth map refinement filtering logic 102, and color image 114 from depth sensor 108. Display device can then reconstruct the image based on the color image 114 and the filtered depth map 116. Display device 118 can be, for example, a computer, a laptop, a television, a mobile device, such as a mobile phone, or any other suitable device capable of displaying images.

Although not indicated in FIG. 1, in some examples depth based scanning system 100 reconstructs the image based on the color image 114 and the filtered depth map 116, and provides a reconstructed image to display device 118. For example, depth based scanning system 100 can generate an object file (e.g., .obj file) from the filtered depth map 116. The object file can include, for example, three-dimensional (3D) coordinates for vertices of the image. Depth based scanning system 100 can also generate a texture map from the color image 114. The texture map can indicate color information (e.g., red, green, and blue) for the vertices of the image. Based on the generated object file and the texture map, depth based scanning system 100 reconstructs the image, and can provide it to display device 118 for display.

Depth map refinement filtering logic 102 is also in communication with instruction memory 106 and working memory 104. Depth map refinement filtering logic 102 can access and execute executable instructions stored in instruction memory 106. For example, instruction memory 106 can include instructions that when executed by depth map refinement filtering logic 102, cause depth map refinement logic 102 to perform one or more of the functions described herein. In some examples, one or more of these functions can be implemented as algorithms. The instruction memory 106 can comprise, for example, electrically erasable programmable read-only memory (EEPROM), flash memory, any non-volatile memory, or any other suitable memory.

Working memory 104 can be used by depth map refinement filtering logic 102 to store a working set of instructions loaded from instruction memory 106. Working memory 105 can also be used by depth map refinement filtering logic 102 to store dynamic data created during the operation of depth map refinement filtering logic 102. In some examples, working memory 104 comprises static random access memory (SRAM), dynamic random access memory (DRAM), or any other suitable memory.

Figure 2:
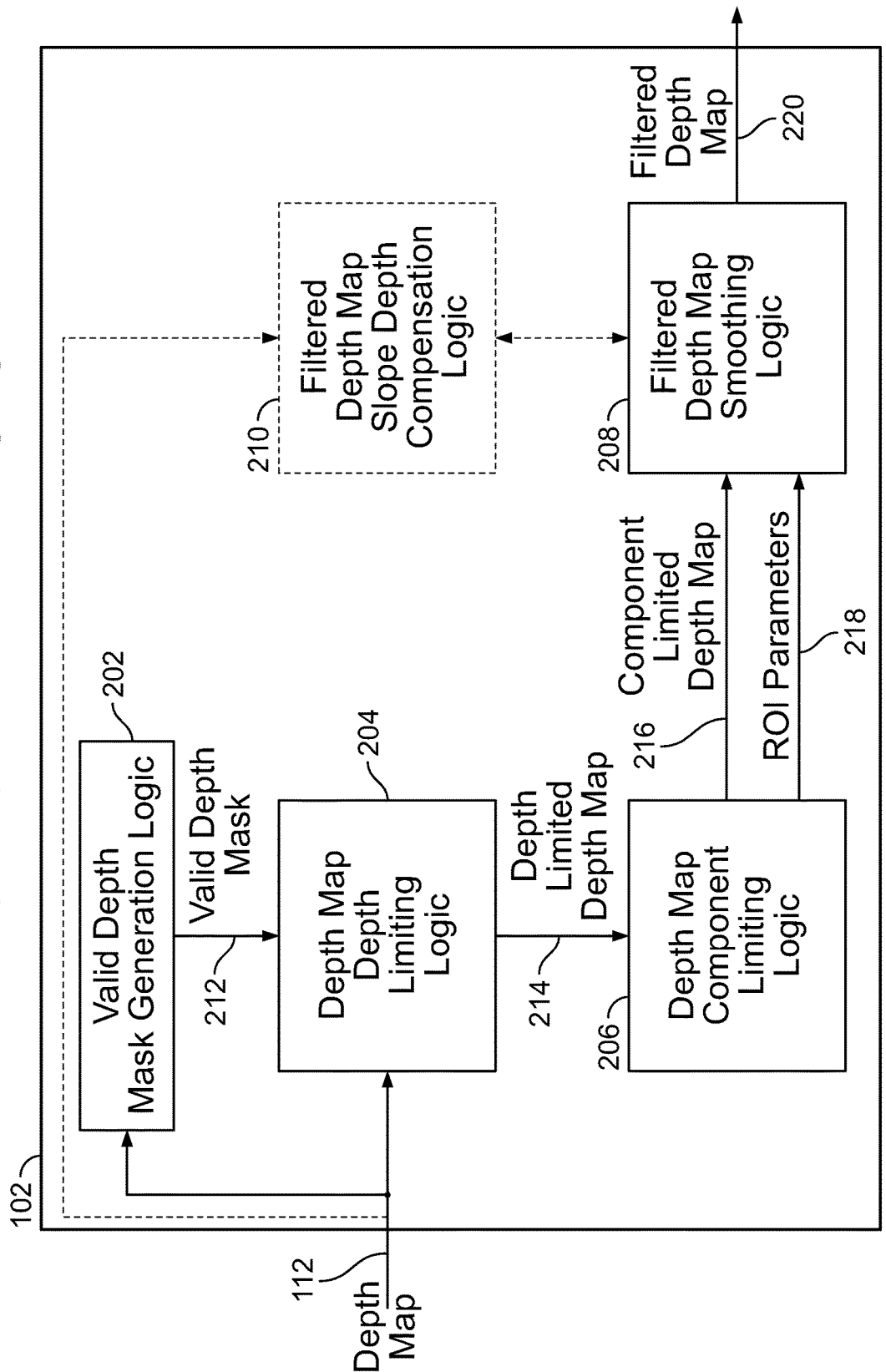
FIG. 2 is a block diagram of a more detailed view of the depth map refinement filtering logic of FIG. 1.

FIG. 2 provides a more detailed view of the depth map refinement filtering logic 102 of FIG. 1. As illustrated in the figure, depth map refinement filtering logic 102 includes valid depth mask generation logic 202, depth map depth limiting logic 204, depth map component limiting logic 206, and filtered depth map smoothing logic 208. Depth map refinement filtering logic 102 can also include filtered depth map slope depth compensation logic 210.

Depth map 112 is obtained by each of valid depth mask generation logic 202 and depth map depth limiting logic 204. Valid depth mask generation logic 202 can determine whether the pixel depth values of depth map 112 are within a depth range. The depth range represents a range of depth values that are deemed valid. For example, the depth range can include a range of depth values from a minimum depth and a maximum depth. For example, the depth range can include a depth range of 500 millimeters to 1,300 millimeters when scanning an object. As another example, the depth range can include a depth range of 300 millimeters to 800 millimeters, when scanning a human face, such as when taking a selfie. The depth range can be stored in working memory 105 or instruction memory 106 of FIG. 1.

Valid depth mask generation logic 202 can determine that a depth value of a pixel of depth map 112 is valid if the depth value is within the depth range (e.g., inclusively). Valid depth mask generation logic 202 can determine the validity of any or all pixels of depth map 112, and is configured (e.g., operable) to provide valid depth mask 212 to depth map depth limiting logic 204. Valid depth mask 212 can be a pixel map indicating which pixels have valid depths, and which do not, for example. Valid depth mask 212 can also be a lookup table indicating the same information, or can be in any other suitable format.

In some examples, valid depth mask generation logic 202 can determine whether the pixel depth values of depth map 112 are within a plurality of depth ranges. For example, each of the plurality of depth ranges can correspond to different depths in the depth map 112. Valid depth mask generation logic 202 can provide a plurality of valid depth masks 212 to depth map depth limiting logic 204, where each valid depth mask 212 corresponds to a different depth range.

Depth map limiting logic 204 obtains the one or more valid depth masks 212 from valid depth mask generation logic 202 and provides a depth limited depth map 214 to depth map component limiting logic 206. The depth limited depth map 214 is free of any invalid depth values (i.e., depth values that fell outside of the depth range described above). For example, depth limited depth map 214 can be the result of a union between each valid depth mask 212 and the depth map 112. If the valid depth mask 212 indicates, for a particular pixel, that its depth value is invalid, depth map limiting logic 204 can replace the invalid depth in depth limited depth map 214. For example, the invalid depth can be replaced with a value indicating a depth of 0 (i.e., no depth). Otherwise, if the valid depth mask 212 indicates that the depth value for the particular pixel is valid, its depth value can remain unchanged.

In some examples, when there are multiple valid depth masks 212, depth map limiting logic 204 can take the union of each valid depth mask 212 and the depth map 112, and take the union of all results. For example, while a pixel's depth value can fall within the depth range identified by one valid depth mask 212, the pixel's depth value can fall outside the depth range identified by another valid depth mask 212. In this example, by taking the union of each individual valid depth mask 212 and the depth map 112, the pixel's depth value is replaced in the second example but not the first. Depth map limiting logic 204 can take the union of these individual union results, and thus the pixel's depth value can remain unchanged in depth limited depth map 214.

Depth map component limiting logic 206 obtains the depth limited depth map 214 and determines at least one component comprised of connected (e.g., adjacent) pixels with a valid depth value. For example, depth map component limiting logic 206 can determine that a component with the most number of connected pixels having valid depth value is the largest component. Depth map component limiting logic 206 can also identify additional components, such as the next largest component. Each component can be associated with a different object in the depth limited depth map 214, for example. Depth map component limiting logic 206 can select, among the components, one or more components for filtering. For example, depth map component limiting logic 206 can select the largest component, out of multiple identified components, for filtering.

If a pixel in the depth limited depth map 214 doesn't correspond to a connected pixel in the one or more selected components, depth map component limiting logic 206 can replace its depth value. Depth map component limiting logic 206 can repeat this process for some or all of the other pixels of depth limited depth map 214 to provide component limited depth map 216. For example, the depth values of any pixels in the depth limited depth map 214 that are not connected pixels of the one or more selected component can be replaced with a value indicating a depth of 0 (i.e., no depth). As such, component limited depth map 216 includes depth values for the one or more selected components; depth values for those components that are not selected are removed. For example, depth values for components that are not selected are set to an invalid depth value (e.g., 0).

Depth map component limiting logic 206 can be configured to determine how many components to not filter. In some examples, depth map component limiting logic 206 determines, for each pixel of the depth limited depth map 214, whether the pixel is part of the connected pixels comprising only the largest component. If a pixel is not part of the connected pixels comprising the largest component, depth map component limiting logic 206 replaces its depth value in component limited depth map 216. In some examples, if a pixel is not part of connected pixels comprising either the largest or next largest component, depth map component limiting logic 206 replaces its depth value in component limited depth map 216.

Depth map component limiting logic 206 can also determine region of interest (ROI) parameters 218 that define an area in the component limited depth map 216 of the one or more components. For example, the ROI parameters can define a range in the horizontal (X) and vertical (Y) directions of the image. In some examples, the ROI parameters define a depth map position and window size, where the area is defined as a window having the window size and centered on the depth map position. In some examples, the ROI parameters define a smallest rectangle that contains the one or more components.

Depth map component limiting logic 206 provides component limited depth map 216 and ROI parameters 218 to filtered depth map smoothing logic 208. Filtered depth map smoothing logic 208 can determine, for a particular pixel, how many neighboring pixels have depth values that were determined to be within the depth range. In some examples, neighboring pixels are pixels within a defined filtering window frame, as will be discussed in more detail with respect to FIGS. 3A and 3B. In some examples, the size of the filtering window frame is based on the size of the component.

For each pixel of a component of the component limited depth map 216, filtered depth map smoothing logic 208 determines (e.g., counts) how many neighboring pixels have valid depth values. Filtered depth map smoothing logic 208 then determines if the total number of neighboring pixels with valid depth values reaches a threshold number (e.g., 10) of neighboring pixels. In some examples, the threshold number of neighboring pixels is based on a size of a defined filtering window frame. For example, the threshold number of neighboring pixels can be the number of pixels in a half of the filtering window frame, or a fourth of the filtering window frame, rounded up or down (e.g., 12 or 13 for a filtering window frame of 25 pixels). The threshold number of neighboring pixels can be stored, for example, in working memory 105 or instruction memory 106 of FIG. 1.

If filtered depth map smoothing logic 208 determines that a pixel has at least the threshold number of neighboring pixels with valid depth values, filtered depth map smoothing logic 208 can compute a replacement depth value for the pixel. In some examples, filtered depth map smoothing logic 208 computes a replacement depth value for the pixel based on the valid depth values of the pixel's neighboring pixels. For example, for each pixel of the connected pixels of a component, if the pixel is determined to be surround by at least the threshold number of neighboring pixels, filtered depth map smoothing logic 208 can replace the pixel's depth value with a filtered depth value that is based on a mean depth value. The mean depth value can be the mean depth of the depth values of those neighboring pixels with a valid depth value. In some examples, the filtered depth value is based on a weighted computation where closer neighboring pixels receive a higher weighting than neighboring pixels that are further away. By replacing pixel values with filtered depth values, filtered depth map smoothing logic 208 can filter (e.g., smooth) the component limited depth map 216 to provide a filtered depth map 220. Because pixels are filtered only if there are a threshold number of neighboring pixels with valid depth values, computation resources can be reduced.

In some examples, filtered depth map smoothing logic is in communication with filtered depth map slope depth compensation logic 210. Filtered depth map slope depth compensation logic 210 can determine a support region around the edges of any component of filtered depth map 220. The size of the support region can be based on the size of the filtering window frame. For example, the size of the support region can be the size of half of the filtering window frame, or a fourth of the filtering window frame, rounded up or down.

For each pixel whose depth value was replaced by filtered depth map smoothing logic 208 with a filtered depth value, filtered depth map slope depth compensation logic 210 can replace the filtered depth value with a depth value of a neighboring pixel from the original depth map 112. For example, if filtered depth map smoothing logic 208 replaced a depth value of a pixel with a filtered depth value, filtered depth map slope depth compensation logic 210 can replace the filtered depth value with the depth value of the corresponding pixel from depth map 112. As such, filtered depth map slope depth compensation logic 210 can recover accuracy around edges of components.

FIGS. 3A and 3B provide examples of a 5×5 filtering window frame where a "0" indicates an invalid depth for a corresponding pixel, and a "1" represents a valid depth for a corresponding pixel. For example, the filtering window frames can be part of a valid depth mask for an image as discussed above. In these examples, the pixel of interest appears in the middle of the filtering window frame and is marked with an "X." In FIG. 3A, the pixel of interest is surrounded by 3 pixels with valid depths (as indicated by 3 "1s"), and 21 pixels with invalid depths (as indicated by 21 "0s"). In FIG. 3B, the pixel of interest is surrounded by 15 pixels with valid depths (as indicated by 15 "1s"), and 9 pixels with invalid depths (as indicated by 9 "0s").

In an example where the threshold number of neighboring pixels is a half of a filtering window frame size (i.e., 12 if rounded down or 13 if rounded up), FIG. 3A represents a case where the filtered depth map smoothing logic 208 of FIG. 2 would not replace the pixel's depth value with a filtered depth value. This is because the number of valid depth values (3) is not greater than the threshold number of neighboring pixels (12 or 13).

In the case of FIG. 3B, however, filtered depth map smoothing logic 208 of FIG. 2 would replace the pixel's depth value with a filtered depth value because the number of valid depth values (21) is greater than the threshold number of neighboring pixels (12 or 13).

Figure 4:
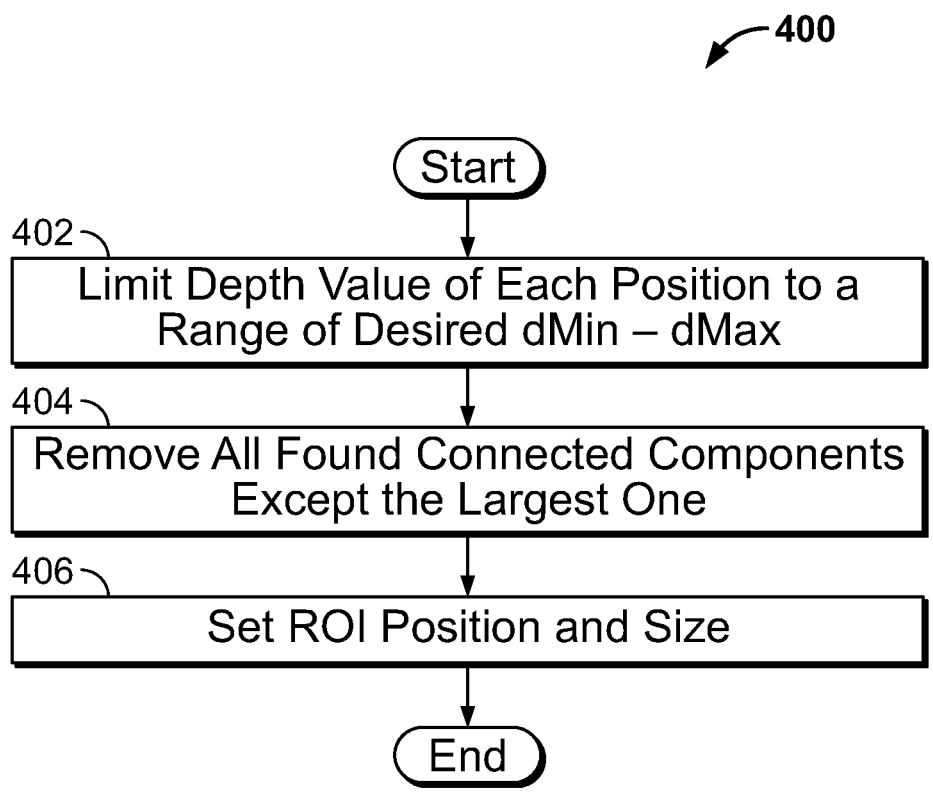
FIG. 4 is a flowchart of an example method that may be carried out by the exemplary depth based scanning system of FIG. 1.

FIG. 4 is a flow chart of an exemplary method 400 for providing a component limited depth map 216. At block 402, the depth value of each pixel is limited to a depth value within a valid depth value range. The valid depth value range can have, in this example, a range of depth values from depth Minimum (dMin) to a value of depth Maximum (dMax), inclusively. At block 404, all components other than the largest component are removed. For example, the largest component can be the component with the most amount of connected pixels defining a component. Any components with a smaller number of connected pixels are removed.

At block 406, the ROI depth map position and window size parameters are determined. The ROI parameters can be, for example, included in the ROI parameters 218 described above.

Figure 5:
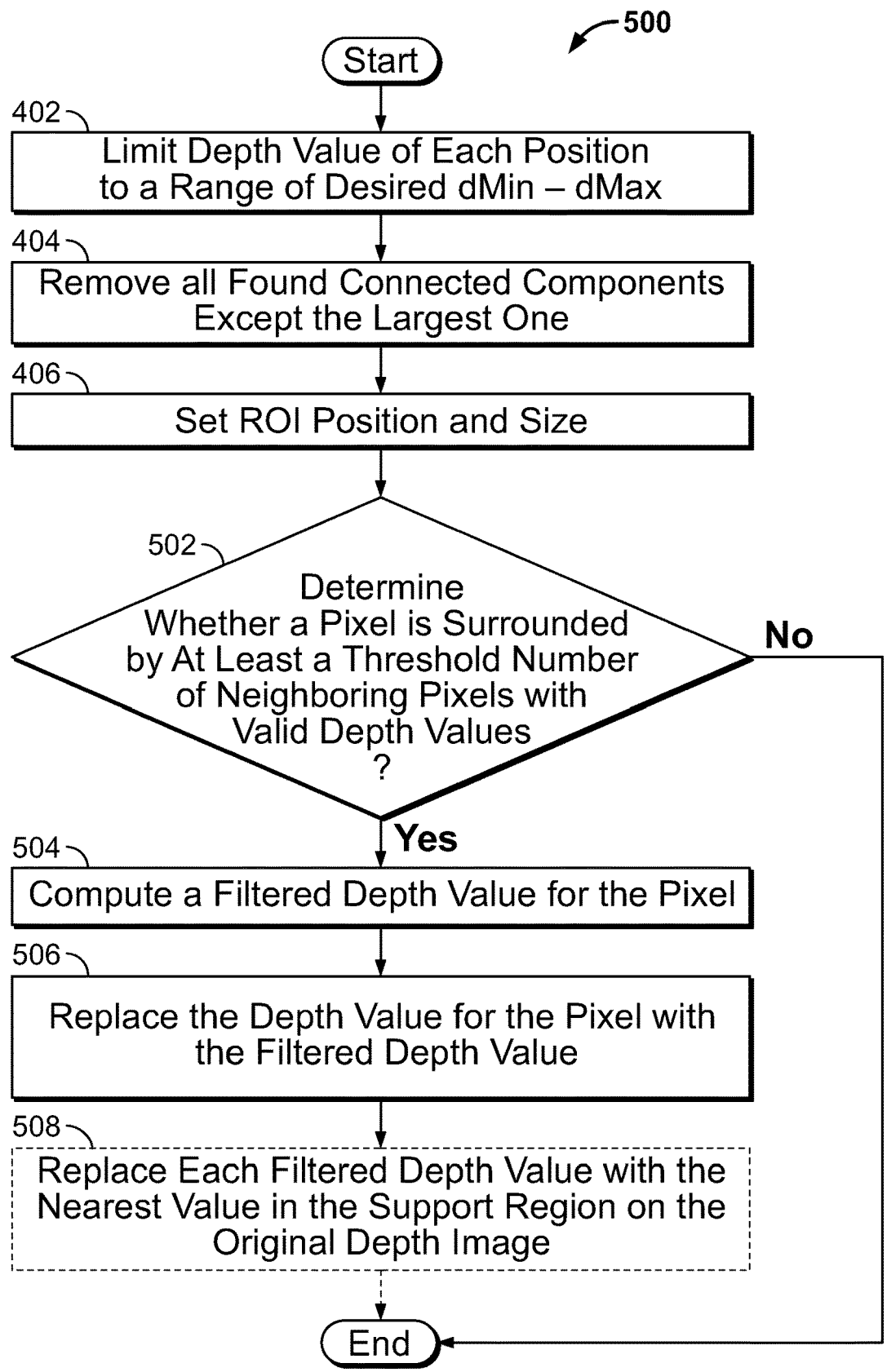
FIG. 5 is a flowchart of another example method that may be carried out by the exemplary depth based scanning system of FIG. 1.

FIG. 5 is a flow chart of an exemplary method 500 of filtering a depth map that incorporates steps from FIG. 4. At block 402, the depth value of each pixel is limited to a depth value within a valid depth value range. At block 404, all components other than the largest component are removed. At block 406, the ROI depth map position and window size parameters are determined. At block 502, a determination is made as to whether a pixel is surrounded by at least a threshold number of neighboring pixels with valid depth values. If the pixel is surrounded by at least the threshold number of neighboring pixels with valid depth values, the method proceeds to block 504; otherwise, the method ends.

At block 504, a filtered depth value for the pixel is computed. The filtered depth value can be based on an average depth value for the number of neighboring pixels with valid depth values. At block 506, the depth value for the pixel is replaced with the filtered depth value. Optionally, at step 508, filtered depth values for pixels in a support region can be replaced with original depth values (e.g., depth values before filtering). For example, the support region can include edges of object in the image. If the pixels corresponding to those edges were filtered (e.g., as in step 506), then their depth values are replaced with original depth values (e.g., depth values as received into step 402).

Although the methods described above are with reference to the illustrated flowcharts, it will be appreciated that many other ways of performing the acts associated with the methods can be used. For example, the order of some operations may be changed, and some of the operations described may be optional. In addition, the steps of the methods can be embodied in hardware, in executable instructions executed by a processor (e.g., software), or in a combination of the two.

Figure 6A:
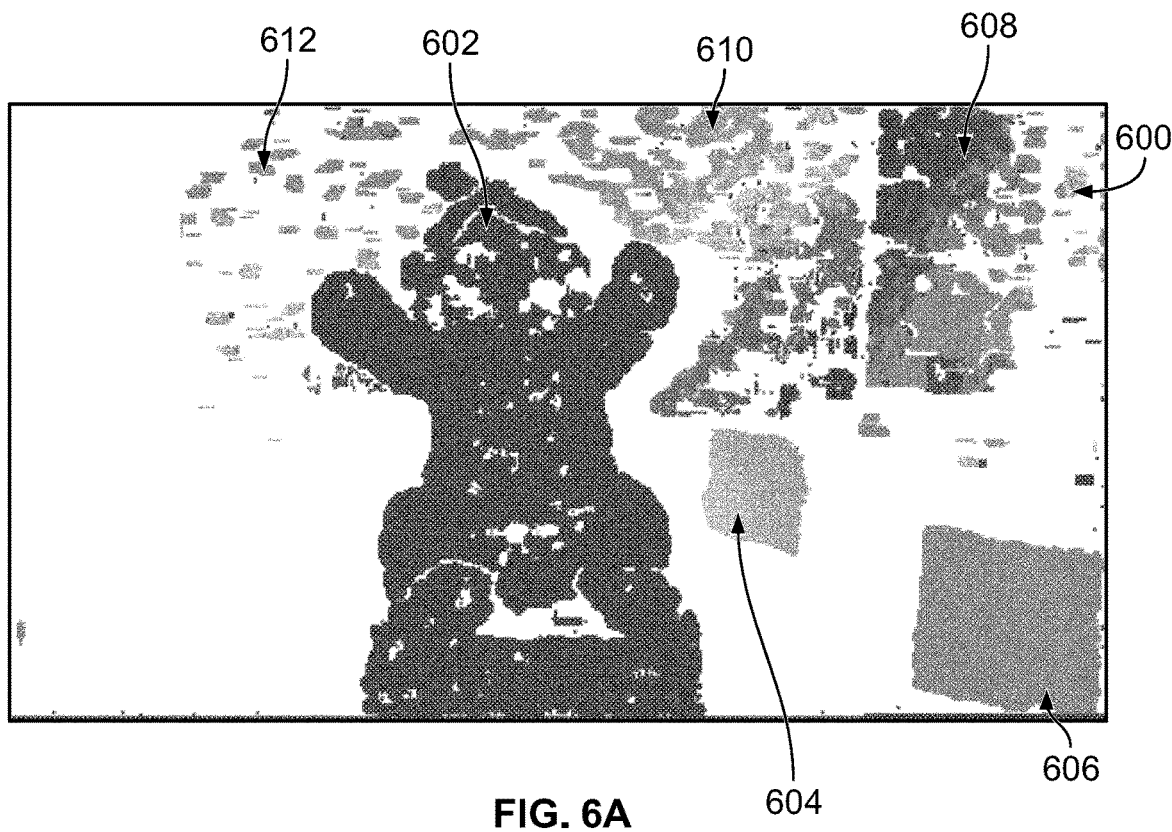
FIG. 6A is a diagram of an exemplary unfiltered depth image.
Figure 6B:
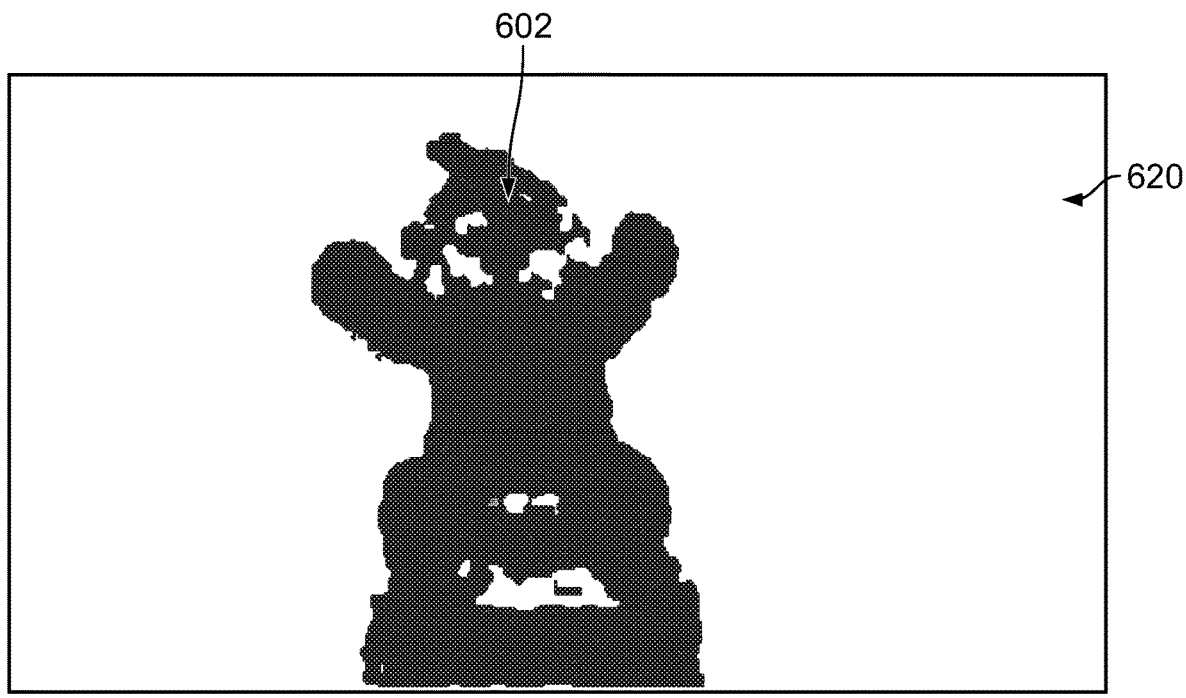
FIG. 6B is a diagram of the depth image of FIG. 6A after having been filtered by the exemplary depth based scanning system of FIG. 1.

FIG. 6A illustrates a diagram of an exemplary depth image 600 before filtering. The unfiltered depth image 600 includes a largest object 602, as well as smaller objects 604, 606, 608, 610, 612. FIG. 6B shows a diagram of the depth image 600 of FIG. 6A after filtering the depth image 600 with the depth based scanning system 100 of FIG. 1. In this example, depth based scanning system 100 is configured to replace depth values for pixels that are not part of the largest component. For example, depth based scanning system 100 identifies component 602 as the largest component, and replaces the depth values for the pixels that are not part component 602, such as the depth values for pixels associated with smaller objects 604, 606, 608, 610, 612. Notably, FIG. 6B shows no depth for the areas corresponding to smaller objects 604, 606, 608, 610, 612 in FIG. 6A.

We claim:

1. An apparatus for processing a depth map comprising one or more processors configured to:
    obtain the depth map, wherein the depth map comprises a plurality of pixel depth values corresponding to a plurality of pixels of an image;
    determine whether each of the plurality of pixel depth values of the plurality of pixels is within a depth range;
    determine whether each pixel of the plurality of pixels determined to have a pixel depth value within the depth range has at least a threshold number of neighboring pixels with a depth value determined to be within the depth range; and
    for each pixel of the plurality of pixels determined to have a pixel depth value within the depth range, if the pixel is determined to have at least the threshold number of neighboring pixels, replace its depth value with a filtered depth value that is based on the depth values of the neighboring pixels with a depth value within the depth range.

2. The apparatus of claim 1 wherein the one or more processors are configured to:
    determine at least one component comprised of connected pixels of the plurality of pixels, wherein each of the connected pixels has a pixel depth value determined to be within the depth range;
    determine whether each pixel of the at least one component has at least the threshold number of neighboring pixels with a depth value determined to be within the depth range; and
    for each pixel of the at least one component, if the pixel is determined to have at least the threshold number of neighboring pixels, replace its depth value with the filtered depth value.

3. The apparatus of claim 2 wherein the one or more processors are configured to:
    determine a valid depth mask based on the plurality of pixel depth values, wherein the valid depth mask indicates, for each pixel of the plurality of pixels, whether its depth value was determined to be within the depth range; and determine the at least one component comprised of the connected pixels based on a union of the depth map and the valid depth mask.

4. The apparatus of claim 1 wherein the one or more processors are configured to:
determine a plurality of components each comprised of connected pixels of the plurality of pixels wherein each of the connected pixels has a pixel depth value within the depth range; and
determine the at least one component is a first largest component of the plurality of components with a first highest number of connected pixels.

5. The apparatus of claim 4 wherein the one or more processors are configured to:
determine the at least one component further comprises a second largest component of the plurality of components with a second highest number of connected pixels;
determine whether each pixel of the second largest component has at least the threshold number of second neighboring pixels with a depth value determined to be within the depth range; and
for each pixel of the second largest component, if the pixel is determined to have at least the threshold number of second neighboring pixels, replace its depth value with a second filtered depth value that is based on the depth values of the second neighboring pixels with a depth value within the depth range.

6. The apparatus of claim 4 wherein the depth range comprises a first depth range and a second depth range different from the first depth range, and wherein the one or more processors are configured to:
determine the first largest component of the plurality of components comprises the first highest number of connected pixels with depth values within the first depth range;
determine a second largest component of the plurality of components with a second highest number of connected pixels with depth values within the second depth range;
determine whether each pixel of the second largest component has at least a second threshold number of neighboring pixels with a depth value determined to be within the second depth range; and
for each pixel the second largest component, if the pixel is determined to have at least the second threshold number of neighboring pixels, replace its depth value with a second filtered depth value that is based on the depth values of the neighboring pixels with a depth value within the second depth range.

7. The apparatus of claim 1 wherein the one or more processors are configured to determine that the filtered depth value is a mean value of the depth values of the number of neighboring pixels with a depth value within the depth range.

8. The apparatus of claim 1 wherein the one or more processors are configured to determine that the threshold number of neighboring pixels comprise a window of connected pixels around each pixel of the connected pixels.

9. The apparatus of claim 8 wherein the one or more processors are configured to determine a size of the window of connected pixels to be based on a size of the at least one component.

10. The apparatus of claim 1 wherein the one or more processors are configured to:
determine a support region around the edges of the at least one component; and
for each pixel of the plurality of pixels whose depth value was replaced with the filtered depth value, replace the filtered depth value with a depth value of a neighboring pixel from the depth map if the pixel is located within the support region.

11. A method of processing a depth map comprising:
obtaining the depth map, wherein the depth map comprises a plurality of pixel depth values corresponding to a plurality of pixels of an image;
determining whether each of the plurality of pixel depth values of the plurality of pixels is within a depth range;
determining whether each pixel of the plurality of pixels determined to have a pixel depth value within the depth range has at least a threshold number of neighboring pixels with a depth value determined to be within the depth range; and
for each pixel of the plurality of pixels determined to have a pixel depth value within the depth range, if the pixel is determined to have at least the number of neighboring pixels, replacing its depth value with a filtered depth value that is based on the depth values of the neighboring pixels.

12. The method of claim 11 comprising:
determining at least one component comprised of connected pixels of the plurality of pixels wherein each of the connected pixels has a pixel depth value determined to be within the depth range;
determining whether each pixel of the at least one component has at least the threshold number of neighboring pixels with a depth value determined to be within the depth range; and
for each pixel of the at least one component, if the pixel is determined to have at least the threshold number of neighboring pixels, replacing its depth value with the filtered depth value.

13. The method of claim 12 comprising:
determining a valid depth mask based on the plurality of pixel depth values, wherein the valid depth mask indicates, for each pixel of the plurality of pixels, whether its depth value was determined to be within the depth range; and
determining the at least one component comprised of the connected pixels based on a union of the depth map and the valid depth mask.

14. The method of claim 12 comprising:
determining a plurality of components each comprised of connected pixels of the plurality of pixels wherein each of the connected pixels has a pixel depth value within the depth range; and
determining that the at least one component is a first largest component of the plurality of components with a first highest number of connected pixels.

15. The method of claim 14 comprising:
determining that the at least one component further comprises a second largest component of the plurality of components with a second highest number of connected pixels;
for each pixel of the second largest component, if the pixel is determined to have at least the threshold number of second neighboring pixels, replacing its depth value with a second filtered depth value that is based on the depth values of the second neighboring pixels with a depth value within the depth range.

16. The method of claim 12 comprising:
determining that the depth range comprises a first depth range and a second depth range different from the first depth range;

determining that the first largest component of the plurality of components comprises the first highest number of connected pixels with depth values within the first depth range;
determining a second largest component of the plurality of components with a second highest number of connected pixels with depth values within the second depth range;
determining whether each pixel of the second largest component has at least a second threshold number of neighboring pixels with a depth value determined to be within the second depth range; and
for each pixel of the second largest component, if the pixel is determined to have at least the second threshold number of neighboring pixels, replacing its depth value with a second filtered depth value that is based on the depth values of the neighboring pixels with a depth value within the second depth range.

17. The method of claim 12 comprising determining that the filtered depth value is a mean value of the depth values of the number of neighboring pixels with a depth value within the depth range.

18. The method of claim 12 comprising determining that the threshold number of neighboring pixels comprise a window of connected pixels around each pixel of the connected pixels.

19. The method of claim 18 comprising determining a size of the window of connected pixels to be based on a size of the at least one component.

20. The method of claim 12 comprising:
determining a support region around the edges of the at least one component; and
for each pixel of the plurality of pixels whose depth value was replaced with the filtered depth value, replacing the filtered depth value with a depth value of a neighboring pixel from the depth map if the pixel is located within the support region.

21. A non-transitory, computer-readable storage medium comprising executable instructions which, when executed by one or more processors, causes the one or more processors to:
obtain a depth map comprising a plurality of pixel depth values corresponding to a plurality of pixels of an image;
determine whether each of the plurality of pixel depth values of the plurality of pixels is within a depth range;
determine whether each pixel of the plurality of pixels determined to have a pixel depth value within the depth range has at least a threshold number of neighboring pixels with a depth value determined to be within the depth range; and
for each pixel of the plurality of pixels determined to have a pixel depth value within the depth range, if the pixel is determined to have at least the number of neighboring pixels, replace its depth value with a filtered depth value that is based on the depth values of the neighboring pixels with a depth value within the depth range.

22. The storage medium of claim 21 wherein the executable instructions cause the one or more processors to:
determine at least one component comprised of connected pixels of the plurality of pixels wherein each of the connected pixels has a pixel depth value determined to be within the depth range;
determine whether each pixel of the at least one component has at least the threshold number of neighboring pixels with a depth value determined to be within the depth range; and
for each pixel of the at least one component, if the pixel is determined to have at least the threshold number of neighboring pixels, replace its depth value with the filtered depth value.

23. The storage medium of claim 22 wherein the executable instructions cause the one or more processors to:
determine a valid depth mask based on the plurality of pixel depth values, wherein the valid depth mask indicates, for each pixel of the plurality of pixels, whether its depth value was determined to be within the depth range; and
determine the at least one component comprised of the connected pixels based on a union of the depth map and the valid depth mask.

24. The storage medium of claim 22 wherein the executable instructions cause the one or more processors to:
determine a plurality of components each comprised of connected pixels of the plurality of pixels wherein each of the connected pixels has a pixel depth value within the depth range; and
determine the at least one component is a first largest component of the plurality of components with a first highest number of connected pixels.

25. The storage medium of claim 24 wherein the executable instructions cause the one or more processors to:
determine the at least one component further comprises a second largest component of the plurality of components with a second highest number of connected pixels;
determine whether each pixel of the second largest component has at least the threshold number of second neighboring pixels with a depth value determined to be within the depth range; and
for each pixel of the second largest component, if the pixel is determined to have at least the threshold number of second neighboring pixels, replace its depth value with a second filtered depth value that is based on the depth values of the second neighboring pixels with a depth value within the depth range.

26. The storage medium of claim 21 wherein the executable instructions cause the one or more processors to:
determine that the depth range comprises a first depth range and a second depth range different from the first depth range;
determine the first largest component of the plurality of components comprises the first highest number of connected pixels with depth values within the first depth range;
determine a second largest component of the plurality of components with a second highest number of connected pixels with depth values within the second depth range;
determine whether each pixel of the second largest component has at least a second threshold number of neighboring pixels with a depth value determined to be within the second depth range; and
for each pixel of the second largest component, if the pixel is determined to have at least the second threshold number of neighboring pixels, replace its depth value with a second filtered depth value that is based on the depth values of the neighboring pixels with a depth value within the second depth range.

27. The storage medium of claim 21 wherein the executable instructions cause the one or more processors to determine that the filtered depth value is a mean value of the depth values of the number of neighboring pixels with a depth value within the depth range.

28. The storage medium of claim 21 wherein the executable instructions cause the one or more processors to determine that the threshold number of neighboring pixels comprise a window of connected pixels around each pixel of the connected pixels.

29. The storage medium of claim 28 wherein the executable instructions cause the one or more processors to determine a size of the window of connected pixels to be based on a size of the at least one component.

30. The storage medium of claim 21 wherein the executable instructions cause the one or more processors to:
   determine a support region around the edges of the at least one component; and
   for each pixel of the plurality of pixels whose depth value was replaced with the filtered depth value, replace the filtered depth value with a depth value of a neighboring pixel from the depth map if the pixel is located within the support region.

31. A method of processing a depth map, the method comprising:
   obtaining the depth map, wherein the depth map comprises a plurality of depth map pixels each having a pixel depth value, wherein each depth map pixel corresponds to one pixel of a plurality of pixels in an image;
   determining a revised map from the depth map wherein the revised map comprises a plurality of revised map pixels, wherein each of the plurality of revised map pixels corresponds to one of the depth map pixels that has a pixel depth value within a predetermined depth range;
   determining a mask from the depth map wherein the mask comprises a plurality of mask pixels, wherein each of the plurality of mask pixels corresponds to one of the depth map pixels and to one of the revised map pixels;
   for each one of the plurality of mask pixels, assigning a first predetermined value where the corresponding depth map pixel has a pixel depth value that is within the predetermined depth range, otherwise assigning a second predetermined value;
   determining at least one component of the mask wherein the at least one component comprises a plurality of connected pixels each having the first predetermined value;
   determining a largest component of the at least one component of the mask;
   determining a bounding box for the largest component;
   for a target pixel of the mask pixels inside the bounding box, where the target pixel has a threshold number of neighboring pixels assigned the first predetermined value, determining a filtered depth value for the corresponding pixel in the revised map.

* * * * *